US012658953B2

(12) United States Patent
Kim et al.

(10) Patent No.: US 12,658,953 B2
(45) Date of Patent: Jun. 16, 2026

(54) RF CIRCUIT FOR PREDISTORTION AND METHOD OF OPERATING THE SAME

(71) Applicant: SAMSUNG ELECTRONICS CO., LTD., Suwon-si (KR)

(72) Inventors: Sumin Kim, Suwon-si (KR); Hongmin Choi, Suwon-si (KR); Min-Sik Kim, Suwon-si (KR); Changhyun Baek, Suwon-si (KR); Hyung Sun Lim, Suwon-si (KR); Joonhoi Hur, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/743,260

(22) Filed: Jun. 14, 2024

(65) Prior Publication Data

US 2025/0125825 A1 Apr. 17, 2025

(30) Foreign Application Priority Data

Oct. 12, 2023 (KR) ........................ 10-2023-0136167

(51) Int. Cl.
*H04B 1/04* (2006.01)
*H04L 27/36* (2006.01)

(52) U.S. Cl.
CPC ......... *H04B 1/0475* (2013.01); *H04L 27/367* (2013.01); *H04B 2001/0425* (2013.01)

(58) Field of Classification Search
CPC .......... H04B 1/0475; H04B 2001/0425; H04L 27/367

(Continued)

(56) References Cited

U.S. PATENT DOCUMENTS 6,400,775 B1 * 6/2002 Gourgue ............... H03F 1/3247
330/149
8,224,268 B2 * 7/2012 Largey ................... H04B 17/10
455/39

(Continued)

FOREIGN PATENT DOCUMENTS

CN 101662435 A 3/2010
CN 104168238 A 11/2014

(Continued)

OTHER PUBLICATIONS

Qian Hua et al: "A General Adaptive Digital Predistortion Architecture for Stand-Alone RF Power Amplifiers", IEEE Transactions on Broadcasting, vol. 59, No. 3, Sep. 2013, pp. 528-538.

(Continued)

*Primary Examiner* — Kevin M Burd
(74) *Attorney, Agent, or Firm* — Morgan, Lewis & Bockius LLP

(57) ABSTRACT

A radio-frequency (RF) circuit including: a multi-tone generation circuit configured to generate a multi-tone signal including a plurality of tones; a predistortion circuit configured to predistort the multi-tone signal or a modulation signal and output a predistortion signal; a power amplifier configured to amplify the predistortion signal and output an output signal; and a predistortion modeling circuit configured to model a predistortion model corresponding to the predistortion circuit based on the predistortion signal corresponding to the multi-tone signal and the output signal.

20 Claims, 16 Drawing Sheets

(58) Field of Classification Search
USPC .......................................................... 375/297
See application file for complete search history.

(56) References Cited

U.S. PATENT DOCUMENTS

| | | | |
|---|---|---|---|
| 8,294,605 | B1 | 10/2012 | Pagnanelli |
| 8,975,959 | B2 | 3/2015 | Khlat |
| 8,989,250 | B1 | 3/2015 | Warner et al. |
| 9,191,041 | B2 | 11/2015 | Mkadem et al. |
| 9,191,064 | B2 | 11/2015 | Schemmann et al. |
| 9,497,061 | B2 | 11/2016 | Morris et al. |
| 9,590,668 | B1 | 3/2017 | Kim et al. |
| 9,654,058 | B2 | 5/2017 | Martynovich et al. |
| 9,903,908 | B2 * | 2/2018 | Miyanaga ............. H03F 1/3247 |
| 10,305,435 | B1 | 5/2019 | Murugesu et al. |
| 12,341,544 | B2 * | 6/2025 | Ghannouchi ......... H03F 1/3247 |
| 2010/0213924 | A1 * | 8/2010 | Osumi ............... G01R 31/2836 |
| | | | 324/76.44 |

FOREIGN PATENT DOCUMENTS

| | | |
|---|---|---|
| CN | 103248597 B | 2/2017 |
| EP | 0929148 A1 | 7/1999 |

OTHER PUBLICATIONS

Andrew K C Kwan et al: "Wireless Communications Transmitter Performance Enhancement Using Advanced Signal Processing Algorithms Running in a Hybrid DSP/FPGA Platform", J Sign Process Syst (2009) 56:187-198.

EPO Search Report dated Feb. 21, 2025 from the EPO in respect of corresponding EP Patent Application No. 24205297.5.

Chung Arthur et al: "Frequency Doubler Based Outphasing System for Millimeter Wave Vector Signal Generation", 2018 15th European Radar Conference (EURAD).

Chuang Kevin: "Characterization of Power Amplifiers under Multi-Tone Excitation for Wide-Bandwidth Carrier Aggregation Applications", 2019 IEEE Topical Conference on RF/Microwave Power Amplifiers for Radio and Wireless Applications (PAWR), IEEE.

Yuelin Ma et al: "Test bed for characterization and predistortion of power amplifiers", International Journal of RF and Microwave Computer-Aided Engineering, Wiley Interscience, Hoboken, USA. 2012.

Xi Yang et al: "Poly-Harmonic Modeling and Predistortion Linearization for Software-Defined Radio Upconverters", IEEE Transactions on Microwave Theory and Techniques, IEEE, USA. 2010.

Zhuang Yuming et al: "Accurate and robust spectral testing with relaxed instrumentation requirements", 2017 IEEE International Test Conference (ITC), IEEE.

Extended European Search Report dated May 8, 2025 issued in corresponding European Patent Application No. 24205297.5. Note: Qian Hua et al., CN 101 662 435 A, CN 103 248 597 B, EP 0 929 148 A1, and Andrew K C Wkan et al. previously submitted.).

A. E. Abdelrahman, O. Hammi, A. K. Kwan, A. Zerguine and F. M. Ghannouchi, "A Novel Weighted Memory Polynomial for Behavioral Modeling and Digital Predistortion of Nonlinear Wireless Transmitters", in IEEE Transactions on Industrial Electronics, vol. 63, No. 3, pp. 1745-1753, Mar. 2016, doi: 10.1109/TIE.2015. 2494040.

* cited by examiner (a)

Figure 11:
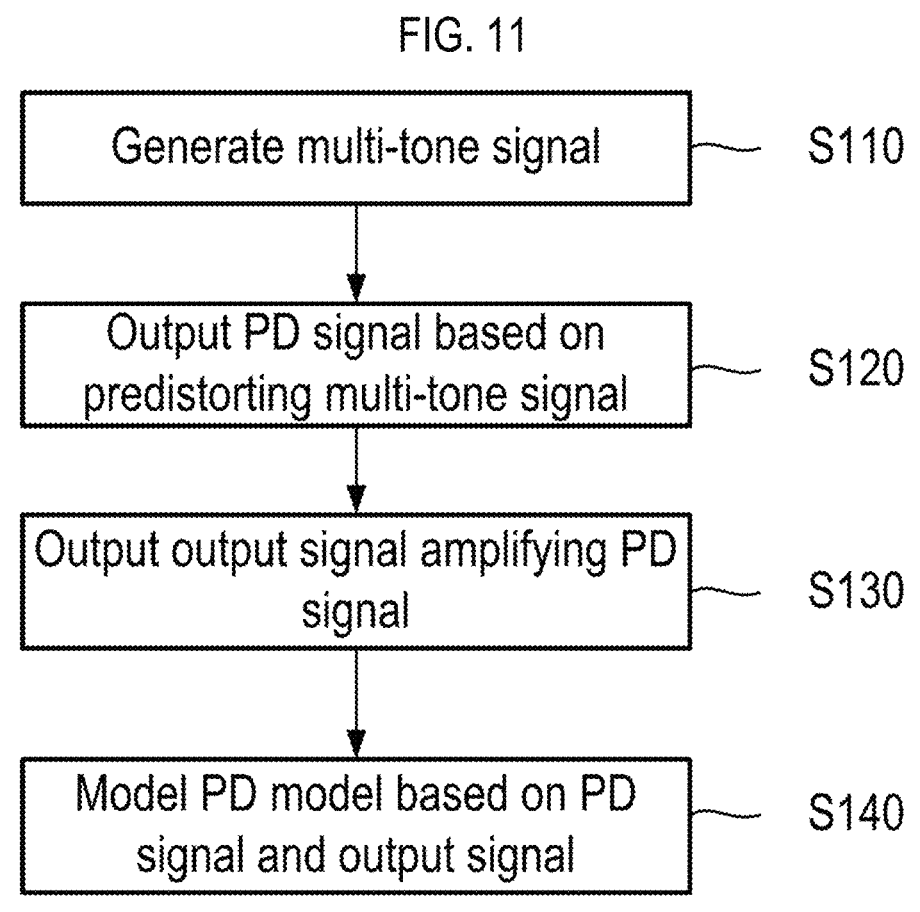

Generate multi-tone signal — S110

Output PD signal based on predistorting multi-tone signal — S120

Output output signal amplifying PD signal — S130

Model PD model based on PD signal and output signal — S140

FIG. 12

Model PA model based on moving average method — S210

Model PD model to compensate for non-linearity of PA model — S220

RF CIRCUIT FOR PREDISTORTION AND METHOD OF OPERATING THE SAME

CROSS-REFERENCE TO RELATED APPLICATION(S)

This U.S. non-provisional application claims priority under 35 U.S.C. § 119 to Korean Patent Application No. 10-2023-0136167, filed on Oct. 12, 2023, in the Korean Intellectual Property Office, the disclosure of which is incorporated by reference herein in its entirety.

TECHNICAL FIELD

Example embodiments of the inventive concept relate to a radio-frequency (RF) circuit for predistortion and a method of operating the same.

DISCUSSION OF RELATED ART

Wireless communication devices, including smartphones, tablet personal computers (PCs), and Internet of Things (IoT) devices, are equipped with a power amplifier (PA) to amplify the power (e.g., boost the strength) of a wireless signal. Since the power amplifier has nonlinear characteristics, a predistortion (PD) method (e.g., a digital PD method) is employed to compensate for these nonlinearities within the digital domain.

SUMMARY

Example embodiments of the inventive concept provide a radio frequency (RF) circuit for predistortion and a method of operating the same.

According to an example embodiment, there is provided an RF circuit including: a multi-tone generation circuit configured to generate a multi-tone signal including a plurality of tones; a predistortion circuit configured to predistort the multi-tone signal or a modulation signal and output a predistortion signal; a power amplifier configured to amplify the predistortion signal and output an output signal; and a predistortion modeling circuit configured to model a predistortion model corresponding to the predistortion circuit based on the predistortion signal corresponding to the multi-tone signal and the output signal.

According to an example embodiment, there is provided a method of operating an RF circuit, the method including: generating a multi-tone signal comprising a plurality of tones; distorting the multi-tone signal and outputting a predistortion signal; amplifying the predistortion signal and outputting an output signal; and modeling a predistortion model based on the predistortion signal corresponding to the multi-tone signal and the output signal.

According to an example embodiment, there is provided an electronic device including: a memory configured to store at least one instruction; and at least one processor configured to execute the at least one instruction, wherein the at least one processor executes the at least one instruction to: generate a multi-tone signal comprising a plurality of tones; distort the multi-tone signal or a modulation signal and output a prediction signal; amplify the predistortion signal and output an output signal; and model a predistortion model based on the predistortion signal corresponding to the multi-tone signal and the output signal.

BRIEF DESCRIPTION OF THE DRAWINGS

The above and other features of the inventive concept will be more clearly understood from the following detailed description of its example embodiments, taken in conjunction with the accompanying drawings.

FIG. 4 is a diagram illustrating a predistortion modeling circuit according to example embodiments.

FIG. 6 is a diagram illustrating curve fitting of a power amplifier for a training signal according to example embodiments.

FIG. 11 is a flowchart illustrating a method of operating an RF circuit according to example embodiments.

FIG. 12 is a flowchart illustrating a method of modeling a predistortion model of an RF circuit according to example embodiments.

FIG. 14 is a diagram illustrating a training information determination circuit according to example embodiments.

FIG. 15 is a diagram illustrating a wireless communication device according to example embodiments.

DETAILED DESCRIPTION OF THE EMBODIMENTS

Hereinafter, example embodiments of the inventive concept will be described with reference to the accompanying drawings.

Figure 1:
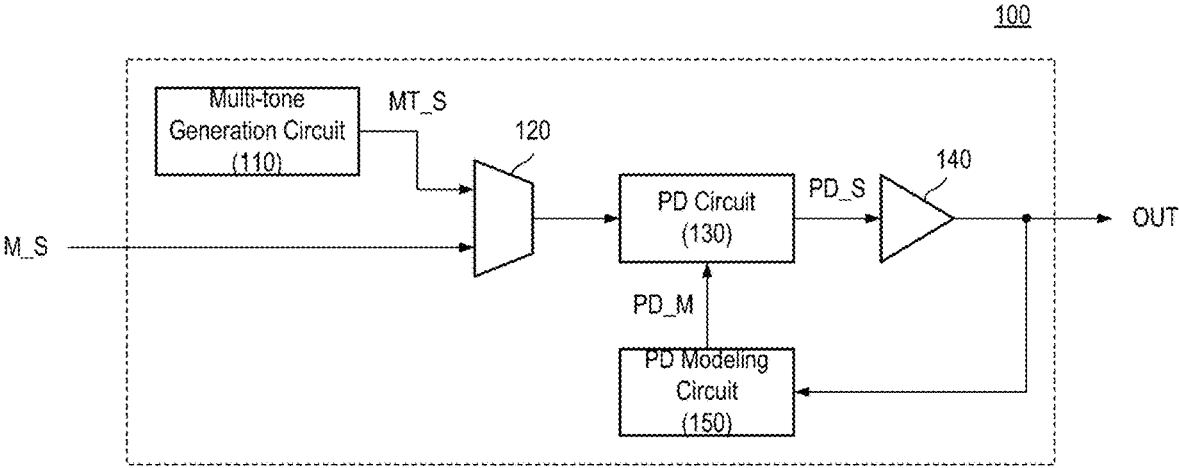
FIG. 1 is a diagram illustrating a radio-frequency (RF) circuit according to example embodiments.

FIG. 1 is a diagram illustrating a radio-frequency (RF) circuit according to example embodiments.

Referring to FIG. 1, an RF circuit 100 according to example embodiments may include a multi-tone generation circuit 110, a multiplexer (MUX) 120, a predistortion (PD) circuit 130, a power amplifier 140, and predistortion (PD) modeling circuit 150.

The multi-tone generation circuit 110 may be configured to generate a multi-tone signal MT_S including a plurality of tones. The multi-tone signal MT_S may be used as a training signal for predistortion. The multi-tone signal MT_S may have a single side band (SSB) or a double side band (DSB). For example, the multi-tone generation circuit 110 may generate the multi-tone signal MT_S based on Equation 1 below.

$$x(t) = \sum_{k=1}^{2N} e^{j(2\pi f_k t + \theta_k)} \qquad \text{Equation 1}$$

where x(t) is a multi-tone signal MT_S, N is the number of a plurality of tones and is a positive integer, $f_k$ is a frequency of each tone, and $\theta_k$ is a phase of each tone.

Alternatively, for example, the multi-tone generation circuit 110 may generate the multi-tone signal MT_S based on Equation 2 below.

$$x(t) = \sum_{k=1}^{N} \cos(2\pi f_k t + \theta_k) \qquad \text{Equation 2}$$

The multi-tone signal MT_S, generated based on Equation 2, may be referred to as a real signal of the signal in Equation 1. For example, an exemplary multi-tone signal MT_S may be a signal in which an imaginary signal is excluded from Equation 1. For example, when the multi-tone generation circuit 110 is configured to generate a multi-tone signal MT_S referred to as a real signal, it may incorporate a single unit that includes a digital-to-analog converter (DAC). This DAC generates an analog signal corresponding to the multi-tone signal MT_S from a digital signal. Accordingly, hardware resources of the multi-tone generation circuit 110 according to example embodiments may be saved.

According to example embodiments, the multi-tone generation circuit 110 may generate a multi-tone signal MT_S having a relatively uniform probability density function (PDF), compared to a modulation signal M_S. The modulation signal M_S may be a signal modulated based on, for example, quadrature amplitude modulation (16 QAM), 64 QAM, 256 QAM, binary phase-shift keying (BPSK), quadrature phase shift keying (QPSK), or the like. In addition, the modulation signal M_S may include cyclic prefix-orthogonal frequency division multiplexing (CP-OFDM) and/or discrete Fourier transform (DFT)-spread-OFDM (DFT-s-OFDM) generated using to the above-mentioned modulation and multiplexing schemes. The modulation signal M_S may have a relatively non-uniform PDF. Using the modulation signal M_S is used as a training signal does not precisely capture the characteristics of the power amplifier 140, which can lead to a reduction in the effectiveness of predistortion.

For example, the multi-tone generation circuit 110 may generate a multi-tone signal MT_S having a phase value determined for each of the plurality of tones. In this case, the multi-tone signal MT_S may have a uniform PDF.

The multiplexer 120 may be connected to an output terminal of the multi-tone generation circuit 110. The multiplexer 120 may be configured to select one of the multi-tone signal MT_S and the modulation signal M_S and transmit the selected signal to the predistortion circuit 130. Alternatively, in addition to the multiplexer 120, various circuits may be provided between the multi-tone generation circuit 110 and the predistortion circuit 130 to select or switch to one of the input signals (for example, the multi-tone signal MT_S and the modulation signal M_S).

According to some embodiments, when the predistortion modeling circuit 150 models a predistortion model PD_M, the multiplexer 120 may select and output a multi-tone signal MT_S to be used as a training signal. Alternatively, when predistortion modeling is completed, the multiplexer 120 may select and output the modulation signal M_S. For example, when the predistortion modeling circuit 150 does not output the predistortion model PD_M, the multiplexer 120 may select and output the modulation signal M_S.

The predistortion circuit 130 may be configured to predistort any signal selected from the multiplexer 120, for example, the multi-tone signal MT_S or the modulation signal M_S, and to output a predistortion signal PD_S. The predistortion circuit 130 may perform digital predistortion (DPD) to compensate for non-linearity of the power amplifier 140 in a digital domain. For example, because the power amplifier 140 has nonlinear elements, it exhibits nonlinear characteristics. This results in nonlinear distortion in an output signal OUT. The predistortion circuit 130 may be connected to an input terminal of the power amplifier 140 to compensate for such nonlinearity. The predistortion circuit 130 may be designed to receive a predistortion model PD_M, modeled from the predistortion modeling circuit 150, and predistort an input signal (for example, the multi-tone signal MT_S or the modulation signal M_S) based on the predistortion model PD_M. This model causes the input signal to have a distortion opposite to the nonlinear distortion of the power amplifier 140.

An input signal of the predistortion circuit 130 may be a digital signal in a baseband, and therefore, a predistortion operation of the predistortion circuit 130 may be performed in the digital domain. Accordingly, even when an output signal OUT of the power amplifier 140 is amplified through the power amplifier 140 having nonlinear distortion, it may have linear characteristics because it has already been converted into a signal having opposite distortion through the pre-distortion circuit 130. For example, an adjacent channel leakage ratio (ACLR) of the power amplifier 140 may be improved by compensating for its nonlinear characteristics.

As an example, the predistortion model PD_M used for predistortion may include a predistortion look-up table (LUT), a predistortion coefficient, or the like, for distortion compensation. For example, the predistortion LUT may include at least one of an amplitude modulation-to-amplitude modulation (AM-AM) LUT and an AM-to-phase modulation (AM-PM) LUT. For example, the predistortion model PD_M may include a memory predistortion model targeting the power amplifier 140, which is subject to a memory effect, and a memoryless predistortion model targeting the power amplifier 140 which is not subject to the memory effect. The memory effect is characterized by the system's response being influenced by previous inputs.

The power amplifier 140 may amplify the predistortion signal PD_S, predistorted from the predistortion circuit 130, to output the output signal OUT. The power amplifier 140 has nonlinear characteristics as described above, so that the output signal OUT may be distorted when no nonlinearity compensation operation, such as a predistortion operation, is performed. The nonlinearity of the output signal OUT may be compensated for by the above-described predistortion circuit 130.

The predistortion modeling circuit 150 may be configured to model the predistortion model PD_M corresponding to the predistortion circuit 130 based on the predistortion signal PD_S corresponding to the multi-tone signal MT_S and the output signal OUT. As described above, the predistortion model PD_M may include, for example, a predistortion LUT and a predistortion coefficient.

In example embodiments, the predistortion modeling circuit 150 may model a power amplifier model and then model the predistortion model PD_M based on the power amplifier model. For example, when the power amplifier model is affected by memory effects, the predistortion modeling circuit 150 may model a memory predistortion model, and when the power amplifier model is not affected by the memory effects, the predistortion modeling circuit 150 may model a memoryless predistortion model.

In example embodiments, the predistortion modeling circuit 150 may be configured to generate a training signal internally without directly capturing (or receiving) a training signal (for example, the multi-tone signal MT_S). For example, even when the predistortion modeling circuit 150 captures only the output signal OUT of the power amplifier 140, the predistortion modeling circuit 150 may model the predistortion model PD_M through the internally generated training signal. In this case, the generated training signal may be the same as the signal generated by the multi-tone generation circuit 110.

The predistortion modeling circuit 150 may transfer the modeled predistortion model PD_M to the predistortion circuit 130. The transfer of the predistortion model PD_M may be referred to as updating a predistortion LUT, a predistortion coefficient, or the like, to be used in the predistortion circuit 130.

In the above-described embodiments, the RF circuit 100 may use a multi-tone signal MT_S, generated separately, as a training signal for predistortion modeling, rather than using a modulation signal M_S as a training signal. In this case, the multi-tone signal MT_S has a uniform PDF, which helps in preventing the degradation of predistortion performance. In addition, the RF circuit 100 generates the multi-tone signal MT_S through the multi-tone generation circuit 110, eliminating the need for an additional memory to store the multi-tone signal MT_S. Without this memory constraint, the RF circuit 100 can make use of a larger number of training signals.

Figure 2:
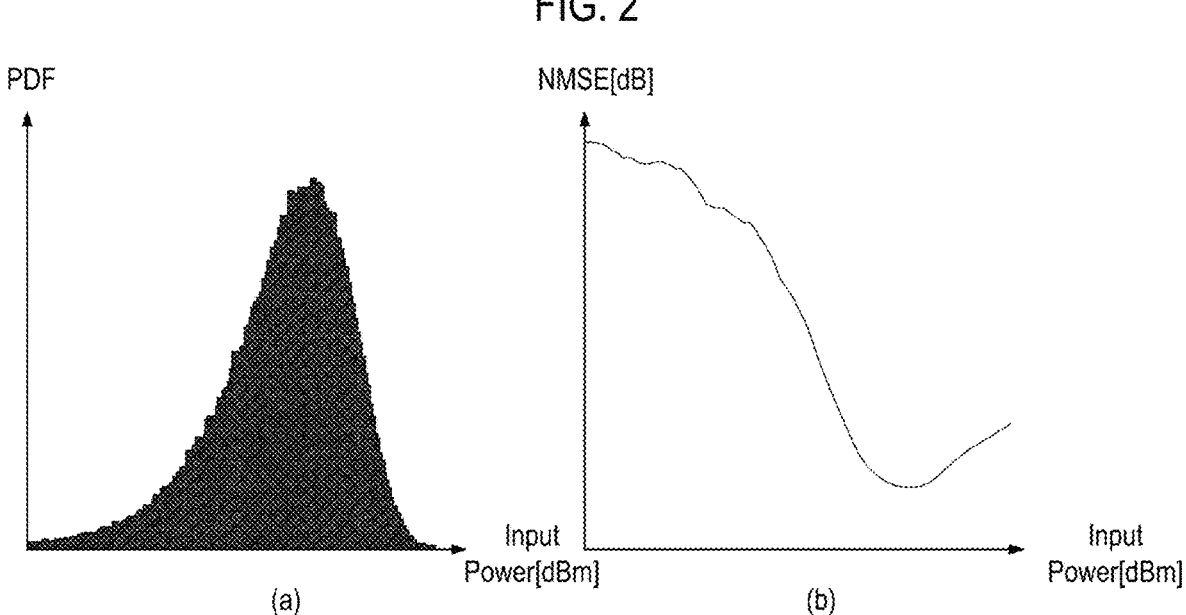
FIG. 2 includes diagrams illustrating a probability density function (PDF) and a normalized mean square error (NMSE) of an exemplary training signal.

FIG. 2 includes diagrams (a) and (b) illustrating a probability density function (PDF) and a normalized mean square error (NMSE) of an exemplary training signal.

For example, when a modulation signal M_S is used as a training signal, the modulation signal M_S may have a PDF, non-uniform with respect to input power of the power amplifier 140, as illustrated in diagram (a). In diagram (a), the PDF is relatively high within a range of −20 to −15 dBm and is relatively low within a range of −40 to −25 dBm. For example, the number of samples of the training signal may be relatively large in a first range, and the number of samples of the training signal may be relatively small in a second range. In this case, when modeling a power amplifier model, defined as the relationship between the training signal and the output signal OUT of the training signal through the power amplifier 140, accurately capturing the characteristics of the power amplifier 140 in the power amplifier model can be challenging.

Within the range in which it is difficult to accurately reflect the characteristics of the power amplifier 140, degradation of predistortion performance may occur. As an example, it can be seen that a PDF is low for input power, lower than that in the case of diagram (a), and corresponding target power and an NMSE is high for lower input power in diagram (b) corresponding to diagram (a). For example, degradation of predistortion performance may occur for lower input power.

As a result, when a modulation signal M_S is used as a training signal, additional time or memory for calibration may be needed to prevent predistortion performance degradation due to characteristics of a non-uniform PDF.

Figure 3:
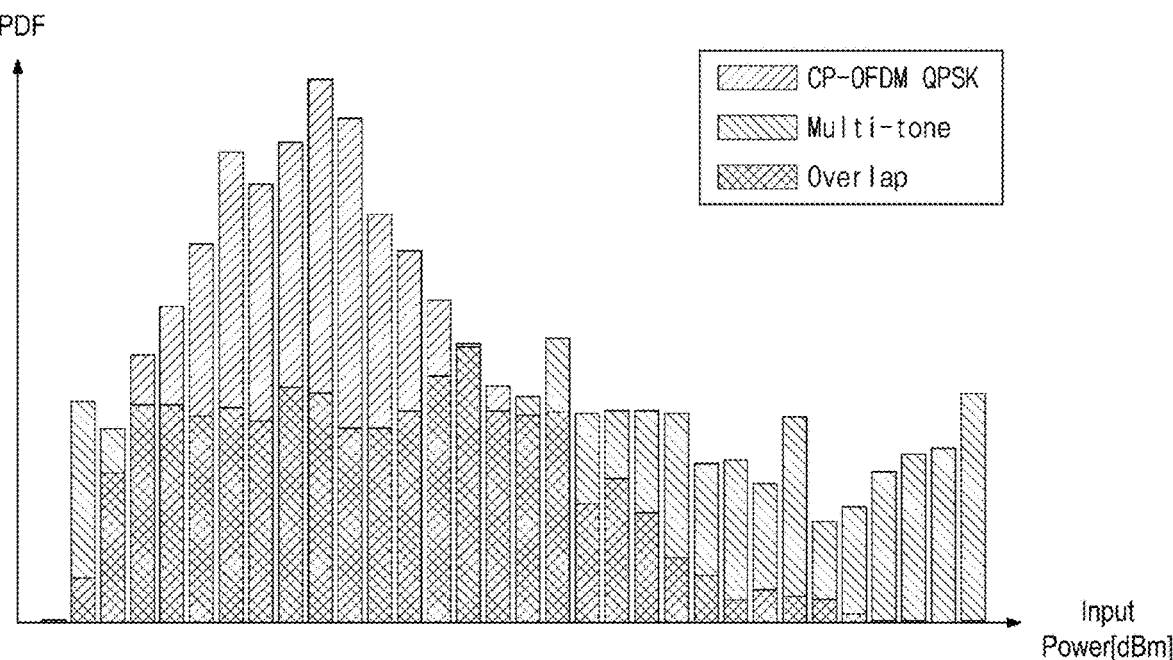
FIG. 3 is a diagram illustrating an exemplary training signal and a PDF of a training signal according to example embodiments.

FIG. 3 is a diagram illustrating an exemplary training signal and a PDF of a training signal according to example embodiments.

FIG. 3 illustrates a PDF in the case in which a QPSK-modulated CP-OFDM signal is used as an exemplary training signal and a multi-tone signal MT_S is used as a training signal according to example embodiments.

As illustrated in FIG. 3, a PDF may be relatively non-uniform with respect to input power when a modulation signal M_S is used as a training signal, but may be relatively uniform when a multi-tone signal MT_S is used as a training signal. Accordingly, by using a multi-tone signal MT_S having a uniform PDF as a training signal for predistortion, the RF circuit according to example embodiments may prevent degradation of predistortion performance.

Figure 4:
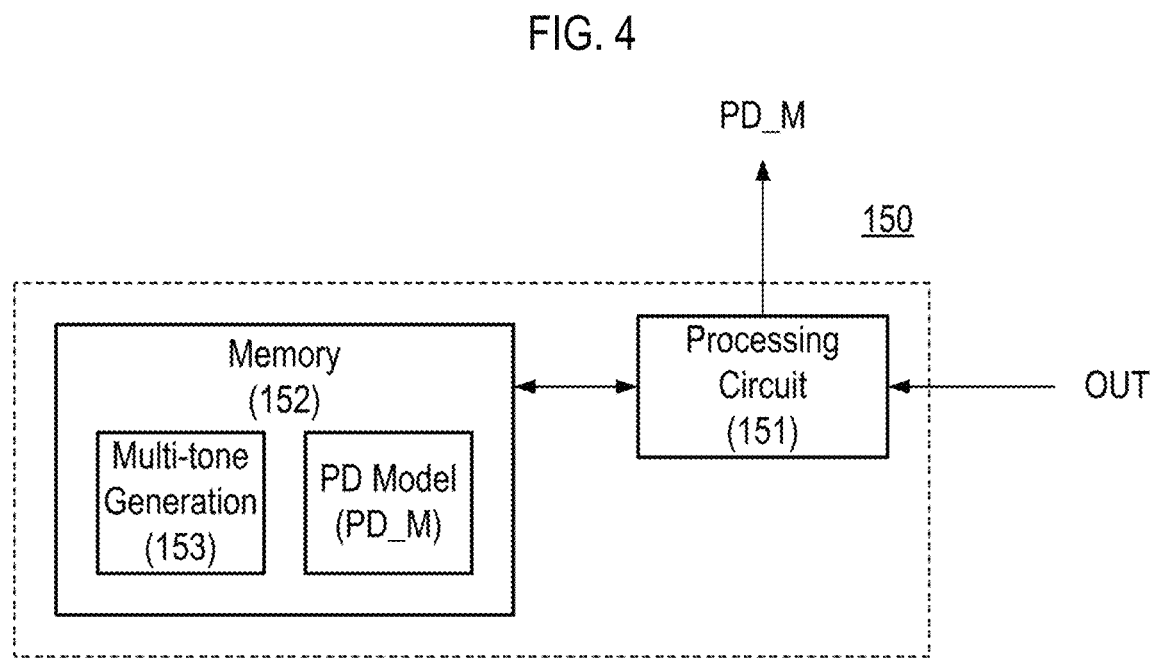

FIG. 4 is a diagram illustrating a predistortion modeling circuit according to example embodiments.

As illustrated in FIG. 4, a predistortion modeling circuit 150 according to example embodiments may include a processing circuit 151 and a memory 152.

The processing circuit 151 may be configured to model a predistortion model PD_M according to the above-described example embodiments.

In example embodiments, the processing circuit 151 may model a power amplifier model. The power amplifier model may be defined as a relationship between an input and an output of the power amplifier 140. For example, the processing circuit 151 may model the power amplifier model based on curve fitting. For example, the processing circuit 151 may perform curve fitting based on polynomial fitting or a method of dividing an input axis of the power amplifier model into a plurality of sections and selecting a representative value of each of the plurality of sections. For example, the processing circuit 151 may perform curve fitting based on a representative value selection method when a multi-tone signal MT_S is used as a training signal.

For example, the representative value selection method may be a moving average method for selecting an average value of an output included in each of the plurality of sections as a representative value of each of the plurality of sections. For example, the moving average method may be performed based on Equation 3 below.

$$\hat{f}(x) = \frac{1}{M} \sum_{i:x_i \in \left[x - \frac{L}{2}, x + \frac{L}{2}\right]} y_i \qquad \text{Equation 3}$$

wherein $\hat{f}(x)$ a representative value of a section, L is a range of the section, i is an index of a power amplifier model input included in the section, $x_i$ is an i-th input value of the power amplifier model, $y_i$ is an output value of the power amplifier model corresponding to $x_i$, and M is the number of $x_i$ included in the section.

Removal of Gaussian noise should be taken into consideration in all sample ranges to apply representative value selection methods including the moving average method. Sufficient samples should be secured in all sample ranges to effectively remove Gaussian noise. For example, the more uniform the PDF of the training signal, the easier it is to apply representative value selection methods.

Therefore, according to example embodiments, when a multi-tone signal MT_S is used as a training signal, the representative value selection method such as the moving average method is available in modeling a power amplifier model. The processing circuit 151 may model the power amplifier model based on the representative value selection method, as opposed to polynomial fitting. Polynomial fitting, which requires high polynomial orders, can present issues in determining a highest polynomial order.

The processing circuit 151 may model a predistortion model PD_M for compensating for the nonlinearity of the power amplifier model, based on the power amplifier model.

In example embodiments, the processing circuit 151 may be connected to the memory 152. The memory 152 may store the predistortion model PD_M modeled through a multi-tone generation circuit 153 and the processing circuit 151. The multi-tone generation circuit 153 may be configured to generate the multi-tone signal MT_S in the same manner as the multi-tone generation circuit 110. Alternatively, the memory 152 may store the multi-tone signal MT_S.

The processing circuit 151 may model the predistortion model PD_M based on the multi-tone signal MT_S generated from the multi-tone generation circuit 153 and an output signal OUT. For example, the processing circuit 151 may model the predistortion model PD_M by using the internally generated multi-tone signal MT_S (for example, the multi-tone signal generated through the memory 152) as the training signal, rather than capturing the training signal from the outside. In this case, since the processing circuit 151 does not require a memory such as a nonvolatile memory to store a large number of training signals, the processing circuit 151 may utilize more training signal samples.

The processing circuit 151 may be implemented as a hardware circuit including hardware or logic circuits, a hardware/software combination such as a processor executing software and/or firmware, or a combination of hardware circuits and hardware/software combinations to perform operations according to the above-described example embodiments.

Figure 5:
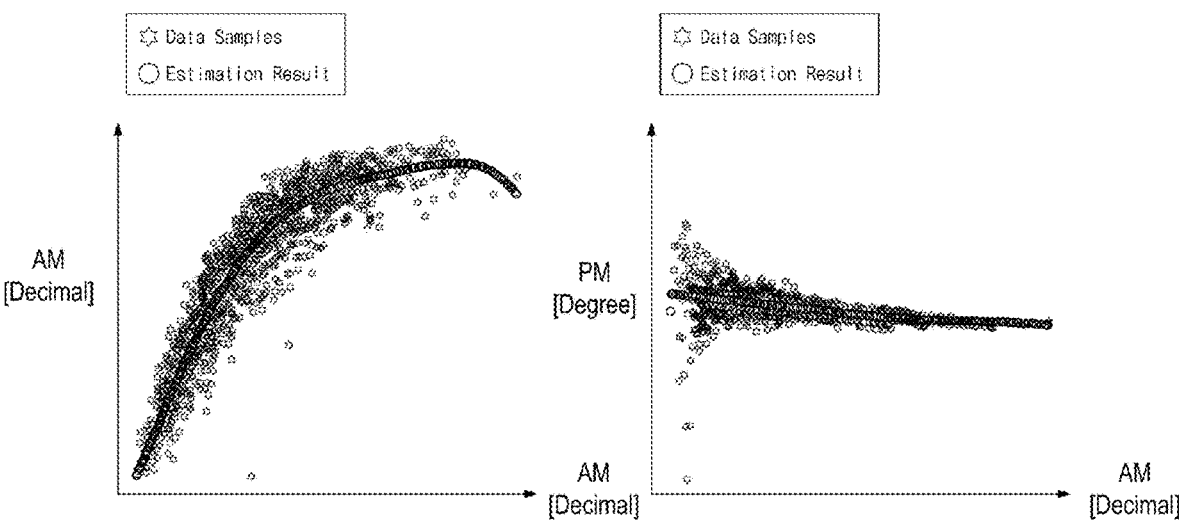
FIG. 5 is a diagram illustrating curve fitting of a power amplifier for an exemplary training signal.
Figure 6:
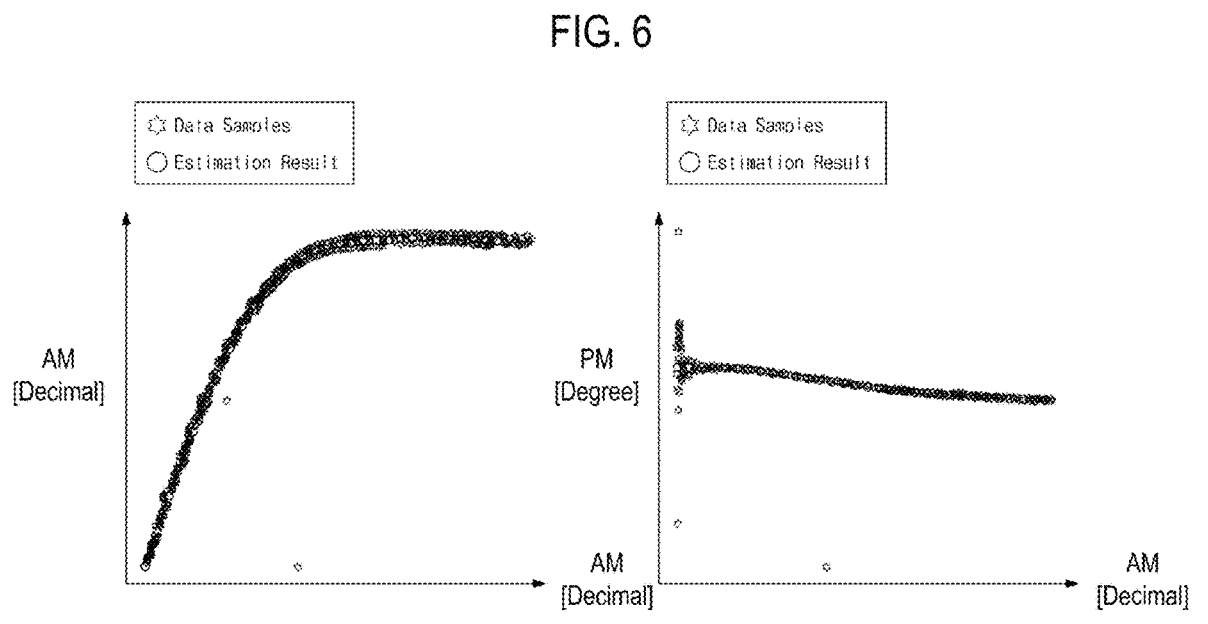

FIG. 5 is a diagram illustrating curve fitting of a power amplifier for an exemplary training signal, and FIG. 6 is a diagram illustrating curve fitting of a power amplifier for a training signal according to example embodiments.

Referring to FIG. 5, when a QPSK-modulated CP-OFDM signal is used as an exemplary training signal, there may be a section in which samples of an input signal and output signal OUT of the power amplifier 140 are not uniform. For example, as illustrated in FIG. 5, the number of samples is small in section in which power of the input signal is high and low. Therefore, it can be seen that sample-dependent curve fitting does not accurately represent the characteristics of the power amplifier 140.

In this case, the power amplifier model based on curve fitting may also be inaccurate, which may result in the degradation of predistortion performance.

Referring to FIG. 6, when a multi-tone signal MT_S is used as a training signal, it can be seen that samples are uniform in most sections. Accordingly, sample-dependent curve fitting may also relatively accurately represent the characteristics of the power amplifier 140. According to example embodiments, predistortion may be performed based on a power amplifier model that more accurately reflects the characteristics of the power amplifier 140 through a multi-tone signal MT_S having a uniform PDF. As a result, the degradation of predistortion performance may be prevented.

Figure 7:
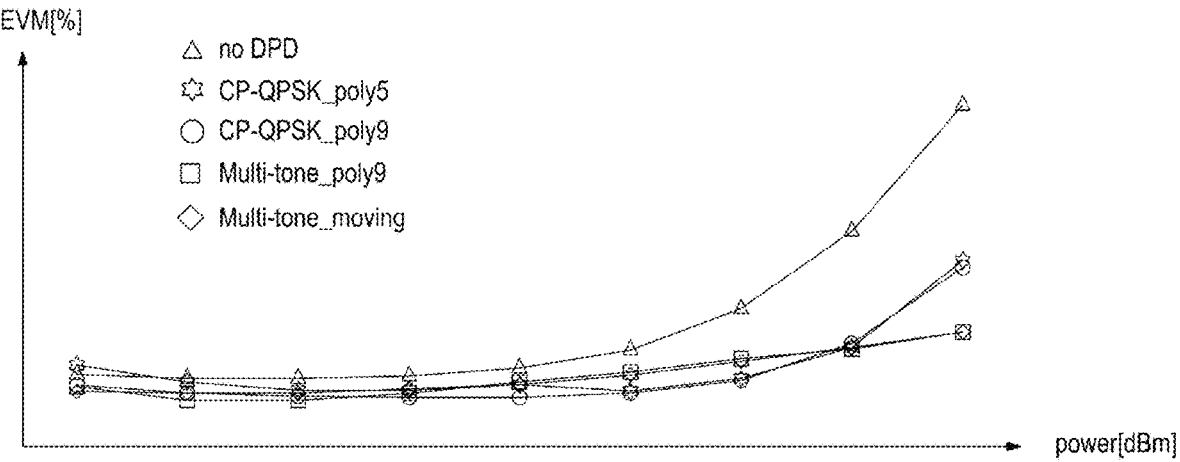
FIG. 7 is a diagram illustrating an error vector magnitude (EVM) for exemplary training signals.

FIG. 7 is a diagram illustrating an error vector magnitude (EVM) for exemplary training signals.

FIG. 7 illustrates cases with and without predistortion performed using a QPSK-modulated CP-OFDM signal and a multi-tone signal MT_S as exemplary training signals. Polynomial fitting with a fifth-degree polynomial (poly5), polynomial fitting with a ninth-degree polynomial (poly9), and a moving average were applied to the training signals.

As described above, only polynomial fitting was used for the modulation signal M_S because the moving average cannot be applied due to a non-uniform PDF.

For example, in FIG. 7, it can be seen that the EVM is lower in a high-power section, compared to the modulation signal M_S, when a multi-tone signal MT_S is used. This is because the multi-tone signal MT_S has a uniform PDF, which can secure sufficient samples even in the high-power section.

In addition, a moving average may be applied when the multi-tone signal MT_S is used. For example, in FIG. 7, it can be seen that when the moving average is applied, the NMSE is almost similar to that of polynomial fitting with a ninth-degree polynomial (poly9). This means that disadvantages caused by the use of a high-order polynomial (for example, calibration time for polynomial determination, or the like) may be reduced by using the multi-tone signal MT_S.

Figure 8:
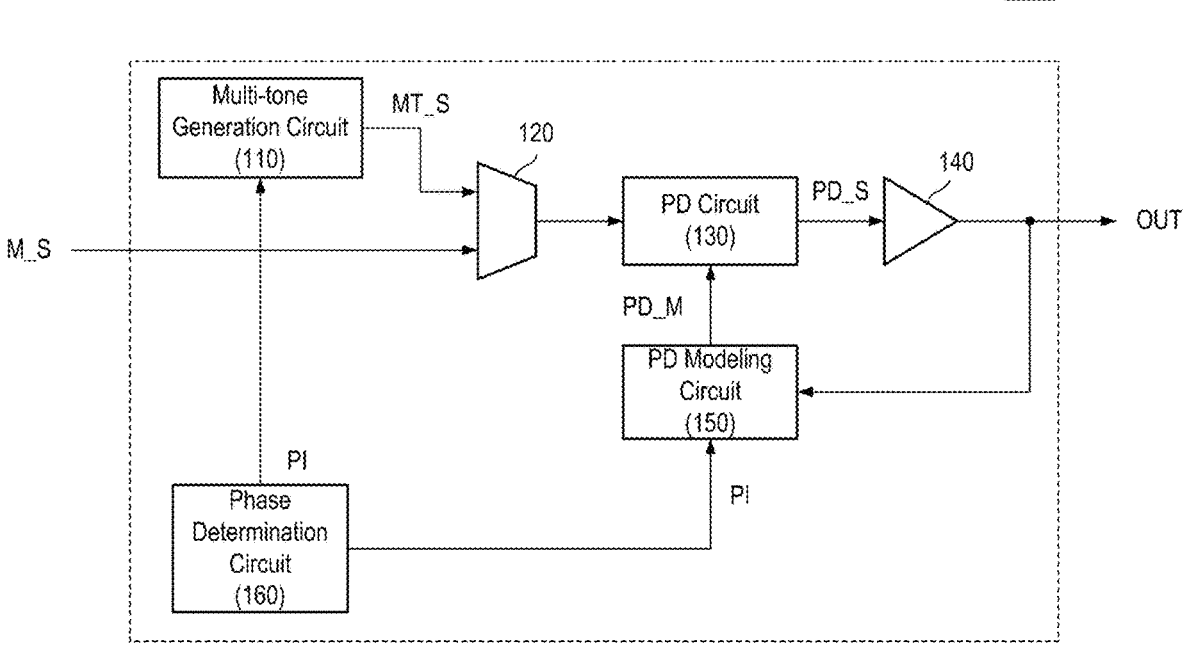
FIG. 8 is a diagram illustrating an RF circuit according to example embodiments.

FIG. 8 is a diagram illustrating an RF circuit according to example embodiments. Hereinafter, detailed descriptions of elements overlapped with those of FIG. 1 may be omitted.

Reference FIG. 8, an RF circuit 100A according to example embodiments may include a phase determination circuit 160, in addition to a multi-tone generation circuit 110, a multiplexer 120, a predistortion circuit 130, a power amplifier 140, and a predistortion modeling circuit 150.

The phase determination circuit 160 may be configured to determine a phase value of each of a plurality of tones in a multi-tone signal MT_S generated from multi-tone generation circuit 110 (or the multi-tone generation circuit 153 of FIG. 4). For example, the phase value may be $\theta_k$ of Equation 1 or Equation 2. The phase determination circuit 160 may adjust the phase values of each of the plurality of tones such that the multi-tone signal MT_S has a uniform PDF.

According to example embodiments, the phase determination circuit 160 may calculate an initial phase value for each of the plurality of tones, and may adjust an initial phase value based on a peak-to-average power ratio (PAPR) of the multi-tone signal MT_S to determine a final phase value. For example, the phase determination circuit 160 may determine a phase value when the PAPR of the multi-tone signal MT_S is significantly reduced, as the final phase value. In other words, the phase determination circuit 160 can identify a phase value as the final phase value when the PAPR of the multi-tone signal MT_S is significantly reduced.

When the training signal has a relatively high PAPR, a PDF of the training signal is also likely to be non-uniform. Therefore, the phase determination circuit 160 according to example embodiments may calculate the PAPR of the training signal, and may adjust the phase value in a direction where the PAPR is significantly reduced. This adjustment ensures that the multi-tone signal MT_S has a relatively uniform PDF.

According to example embodiments, the phase determination circuit 160 may determine a phase value at which the PAPR of the multi-tone signal MT_S is significantly reduced, and may transmit phase information PI, including the determined phase value, to the multi-tone generation circuit 110 and/or the predistortion modeling circuit 150.

The multi-tone generation circuit 110 may receive the phase information PI from the phase determination circuit 160, and may generate a multi-tone signal MT_S based on the phase value included in the phase information PI. Accordingly, the generated multi-tone signal MT_S may have a relatively uniform PDF. In addition, the multi-tone generation circuit 110 may generate the multi-tone signal MT_S to have a predetermined phase value, without a need to additionally determine a phase of each of the plurality of tones. Based on the phase value included in the phase information PI, the predistortion modeling circuit 150 may generate an updated predistortion model PD_M.

Then, the multiplexer 120 may select the multi-tone signal MT_S as a training signal and transmit the selected multi-tone signal MT_S to the predistortion circuit 130. The predistortion circuit 130 may generate a predistortion signal PD_S based on an updated predistortion model PD_M from the predistortion modeling. The power amplifier 140 may amplify the predistorted signal PD_S, and may output an output signal OUT.

According to the above-described example embodiments, the RF circuit 100A may determine a phase value to significantly reduce a PAPR, so that the multi-tone signal MT_S has a uniform PDF. Accordingly, the RF circuit 100A may prevent the degradation of predistortion performance using the multi-tone signal MT_S having the uniform PDF as a training signal for predistortion.

Hereinafter, some examples of the phase determination circuit 160 will be described in more detail.

Figure 9:
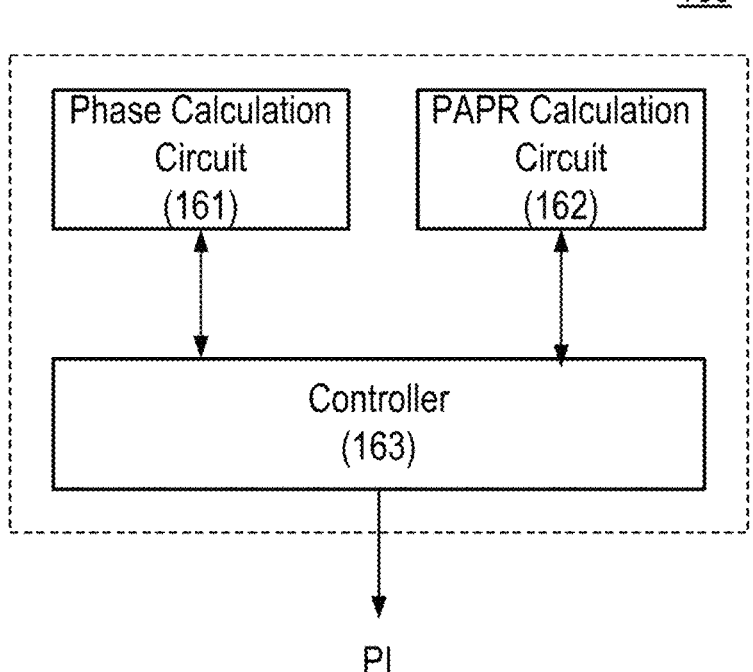
FIG. 9 is a diagram illustrating a phase determination circuit illustrated in FIG. 8.

FIG. 9 is a diagram illustrating a phase determination circuit illustrated in FIG. 8.

Referring to FIG. 9, a phase determination circuit 160 according to example embodiments may include a phase calculation circuit 161, a PAPR calculation circuit 162, and a controller 163.

The phase calculation circuit 161 may be configured to calculate a plurality of initial phase values for a plurality of tones included in a multi-tone signal MT_S. For example, the phase calculation circuit 161 may calculate the initial phase values based on an algorithm for calculating initial phase values, such as the Newman, Kitayoshi, Schroeder, and Narahashi algorithms. For example, Equations 4 to 7 below may be defined as initial phase values based on the Newman, Kitayoshi, Schroeder, and Narahashi algorithms, respectively.

$$\theta_k = \frac{\pi}{N}(k-1)^2 \qquad \text{Equation 4}$$

$$\theta_k = \frac{\pi}{N}k(k+1) \qquad \text{Equation 5}$$

$$\theta_k = -\frac{\pi}{N}(k-1)k \qquad \text{Equation 6}$$

$$\theta_k = \frac{\pi}{N-1}(k-1)(k-2) \qquad \text{Equation 7}$$

In Equations 4 to 7, $\theta_k$ is an initial phase value of a k-th tone, k is an index of each tone, and N is the number of all tones. Here, k and N may be positive integers. In addition, the phase calculation circuit 161 may calculate phases of a plurality of tones based on various methods used to derive the phases of the plurality of tones without being limited to the above-mentioned algorithms. An initial phase value is to be calculated for each tone, so that a plurality of initial phase values may be calculated for the multi-tone signal MT_S by the phase calculation circuit 161.

The PAPR calculation circuit 162 may calculate a PAPR of the multi-tone signal MT_S. Hereinafter, for ease of description, the PAPR of the multi-tone signal MT_S corresponding to a plurality of initial phase values will be referred to as an initial PAPR. In addition, a PAPR corresponding to an adjusted phase set that includes at least one adjusted phase value, which is determined after adjusting at least one of the plurality of initial phase values, will be referred to as a plurality of adjusted PAPR values. The adjusted phase set may be a set of phase values including the at least one adjusted initial phase value. For example, when $\theta_1$ and $\theta_2$ of a first tone and a second tone, among N tones in Equations 4 to 7, are sequentially adjusted, the adjusted phase set may include a first set including the adjusted $\theta_1$ and maintained $\theta_2$ to ON and a second set including the adjusted $\theta_2$ and maintained $\theta_1$ and $\theta_3$ to $\theta_N$. Similarly, when $\theta_k$ is adjusted, the adjusted phase set may include all sets including the adjusted $\theta_k$ and the remaining preserved phases.

In response thereto, a plurality of PAPR adjustment values may be a set of PAPRs calculated from each of the different sets included in the adjustment phase set (for example, the set may include PAPRs calculated from the above-mentioned first set and PAPRs calculated from the above-mentioned second set).

In example embodiments, the PAPR calculation circuit 162 may calculate the PAPR of the multi-tone signal MT_S corresponding to the plurality of phase initial values as a PAPR initial value. As at least one of the plurality of phase initial values is adjusted, the PAPR calculation circuit 162 may calculate the PAPR of the multi-tone signal MT_S corresponding to the adjustment phase set as a plurality of PAPR adjustment values. For example, the PAPR may be a ratio of a peak value of power to an average value of the power.

The controller 163 may be connected to the phase calculation circuit 161 and the PAPR calculation circuit 162, and may determine a phase value of the multi-tone signal MT_S based on the phase initial value and the PAPR.

In example embodiments, the controller 163 may compare the PAPR initial value with a threshold. When the PAPR initial value is less than the threshold, the controller 163 may determine the phase initial value as a final phase value. The threshold may be preset as a value required for PAPR, or may be adjusted by the controller 163. When the PAPR initial value is less than the threshold, the PAPR of the multi-tone signal MT_S is sufficiently low so that the multi-tone signal MT_S is likely to have a uniform PDF. Accordingly, the controller 163 may immediately determine a phase initial value corresponding to the PAPR initial value, less than the threshold, as the final phase value.

Alternatively, when the PAPR initial value is greater than or equal to the threshold, the controller 163 may adjust at least one of the plurality of phase initial values. For example, the controller 163 may adjust a phase value based on various optimization algorithms for gradually adjusting (for example, increasing or decreasing) the phase value. For example, the controller 163 may employ a hill climbing, simulated annealing, or genetic algorithm as the optimization algorithm.

As the controller 163 adjusts at least one of the plurality of phase initial values, the PAPR calculation circuit 162 may calculate a plurality of PAPR adjustment values of an output signal OUT corresponding to an adjustment phase set. For example, when a phase of a k-th tone (k in Equations 4 to 7), among the plurality of phase initial values, is adjusted, the PAPR calculation circuit 162 may calculate the PAPR adjustment value for a set including an adjusted phase and a maintained phase.

The controller 163 may compare the initial PAPR value with all of the plurality of PAPR adjustment values. When the initial PAPR value is less than the plurality of PAPR adjustment values, for example, when the initial PAPR value is less than all of PAPR adjustment values, the controller 163 may determine the initial phase value corresponding to the initial PAPR value as a final phase value. For example, when the PAPR initial value is less than the plurality of PAPR adjustment values, the controller 163 may determine the initial phase value as the final phase value. This is because there is no more room for PAPR improvement through phase adjustment.

Alternatively, when at least one of the plurality of PAPR adjustment values is less than the PAPR initial value, for example, when there is at least one PAPR adjustment value lower than the PAPR initial value, the controller 163 may set a minimum value of the at least PAPR initial value as a PAPR initial value. After setting the minimum value as the PAPR initial value, the controller 163 may determine a phase value based on a reset PAPR initial value.

The controller 163 may transmit phase information PI including the ultimately determined phase value.

According to the above-described example embodiments, the RF circuit may determine a phase for each tone such that the multi-tone signal MT_S has a uniform PDF through the phase determining circuit 160. Accordingly, the components for generating the multi-tone signal MT_S (for example, the multi-tone generating circuit 110) do not require an additional phase determination operation. In addition, the degradation of predistortion performance may be prevented by the multi-tone signal MT_S with a determined phase.

Figure 10:
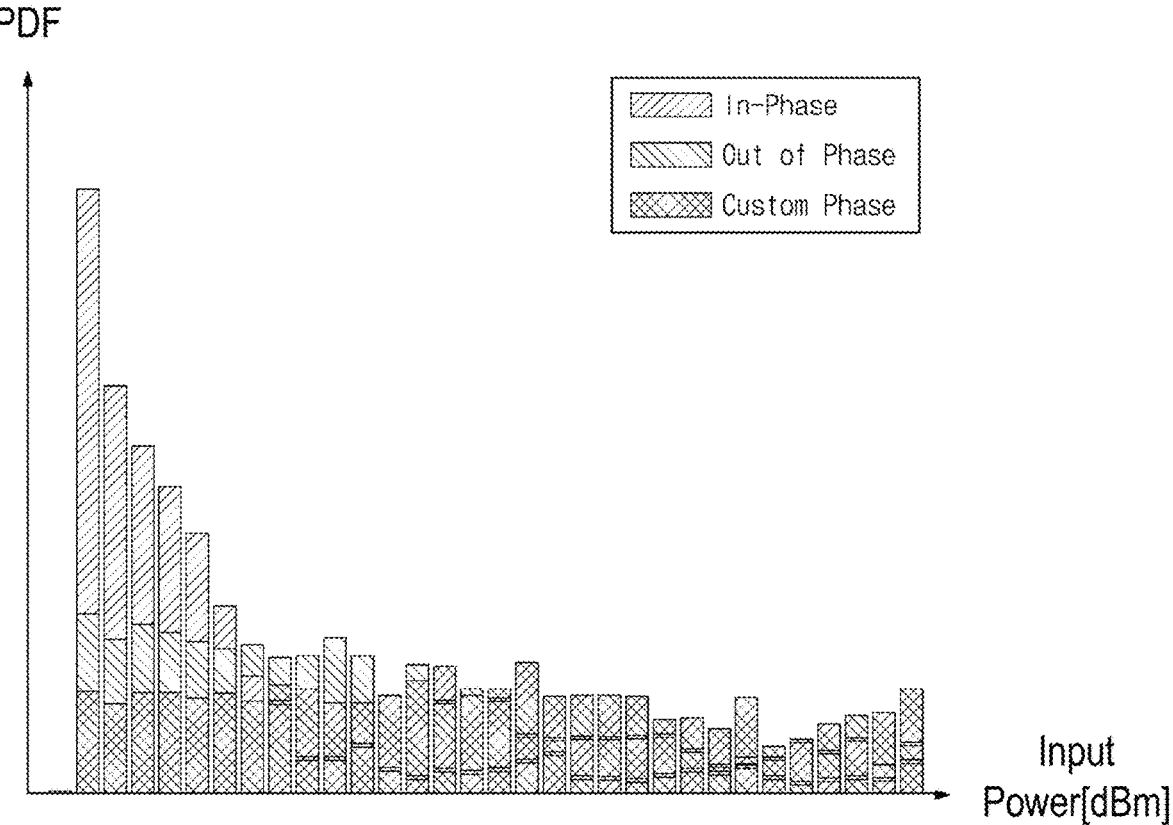
FIG. 10 is a diagram illustrating PDFs of exemplary training signals.

FIG. 10 is a diagram illustrating PDFs of exemplary training signals.

Referring to FIG. 10, exemplary training signals are all multi-tone signals (MT_S), and three cases may be provided as follows: a case in which phases of tones are all zero (In-Phase), a case in which phases of tones are randomly different from each other (Out of Phase), and a case in which phases of tones are appropriately determined according to example embodiments (Custom Phase).

In the case of In-Phase, it can be seen that PDF non-uniformity is significantly high, and a difference between PDFs of a section with low input power and a section with high input power is especially large. In the case of Outof Phase, it can be seen that PDF uniformity is relatively increased compared to the case of In-Phase, but there is still some difference between PDFs of a section with low input power and a section with high input power.

In the case in which a phase is determined (for example, Custom Phase in which the phase is determined to significantly reduce a PAPR), it can be seen that PDF uniformity is highest. As a result, when a corresponding multi-tone signal MT_S is used as a training signal, characteristics of the power amplifier 140 may be more accurately reflected to prevent the degradation of predistortion performance.

FIG. 11 is a flowchart illustrating a method of operating an RF circuit according to example embodiments.

Referring to FIG. 11, in operation S110, the RF circuit 100 or 100A may generate a multi-tone signal MT_S including a plurality of tones. The RF circuit 100 or 100A may generate a multi-tone signal MT_S with a phase determined according to example embodiments. Each of the plurality of tones included in the multi-tone signal MT_S may have a phase determined to significantly reduce a PAPR or to have a uniform PDF.

In operation S120, the RF circuit 100 or 100A may predistort the multi-tone signal MT_S to output a predistortion signal PD_S. The predistortion in operation S120 may be based on a predistortion model PD_M before or after being updated. The multi-tone signal MT_S may be used as a training signal for predistortion.

In operation S130, the RF circuit 100 or 100A may amplify the predistortion signal PD_S to output an output signal OUT. The output signal OUT, output in operation S130, may be used in operation S140 to model the predistortion model PD_M.

In operation S140, the RF circuit 100 or 100A may model the predistortion model PD_M based on the predistortion signal PD_S corresponding to the multi-tone signal MT_S, for example, the predistortion signal PD_S output in operation S120 and the output signal OUT of the power amplifier 140. The process of modeling the predistortion model PD_M can be described as an act of establishing a predistortion LUT or a predistortion coefficient. These elements are designed to offset the nonlinearity of the output signal OUT, with subsequent updates to the predistortion LUT or the predistortion coefficient in the predistortion circuit 130, as described above.

In the above-described method according to example embodiments, operations S120 to S140 may be repeated until a requirement for compensation of the nonlinearity of the output signal OUT is satisfied to the maximum extent. The multi-tone signal MT_S used as the training signal has a uniform PDF, so that the degradation of predistortion performance may be prevented.

According to example embodiments, the method may further include predistorting the modulation signal M_S using the predistortion model PD_M, which is optimized to compensate for the nonlinearity of the power amplifier 140. This is followed by amplifying and outputting the predistorted modulation signal M_S.

According to example embodiments, the method may further include determining a phase value of each of the plurality of tones in the multi-tone signal MT_S.

Figure 12:
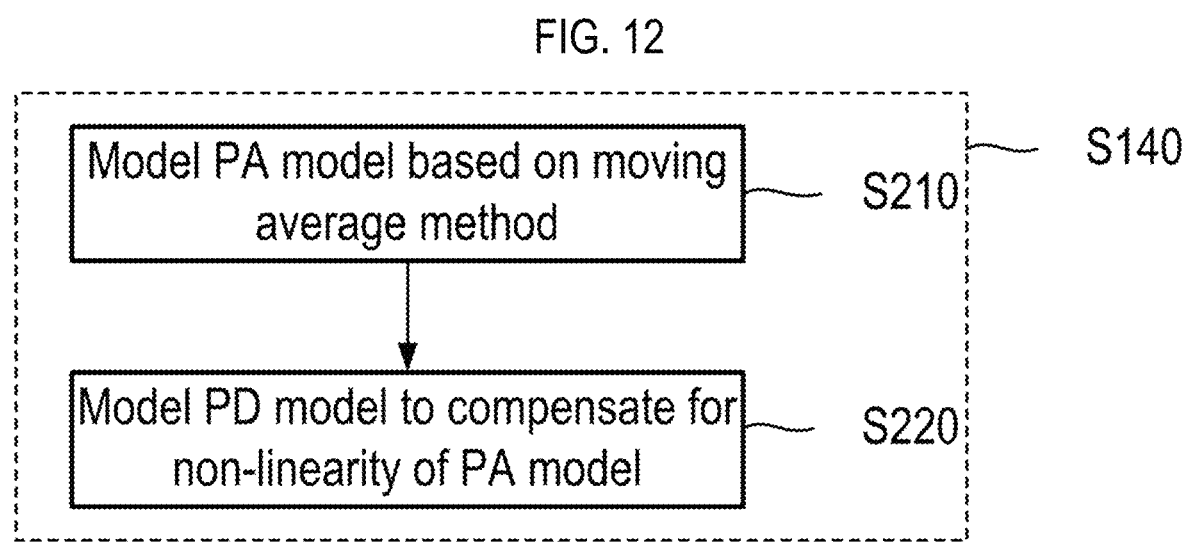

FIG. 12 is a flowchart illustrating a method of modeling a predistortion model of an RF circuit according to example embodiments. For example, FIG. 12 may correspond to operation S140 of FIG. 11.

Referring to FIG. 12, in operation S210, the RF circuit 100 or 100A may model a power amplifier model, which is a relationship between a predistorted signal PD_S and an output signal OUT corresponding to a multi-tone signal MT_S, based on a moving average method. As described above, when a training signal is used as a multi-tone signal MT_S, a moving average method requiring a uniform PDF in the curve fitting for modeling the power amplifier model may be adopted. Accordingly, the power amplifier model may be modeled without a burden of having to perform certain operations (for example, operations for determining a high-order polynomial in polynomial fitting).

In operation S220, the RF circuit 100 or 100A may model a predistortion model PD_M to compensate for the nonlinearity of the power amplifier model modeled in operation S210.

Figure 13:
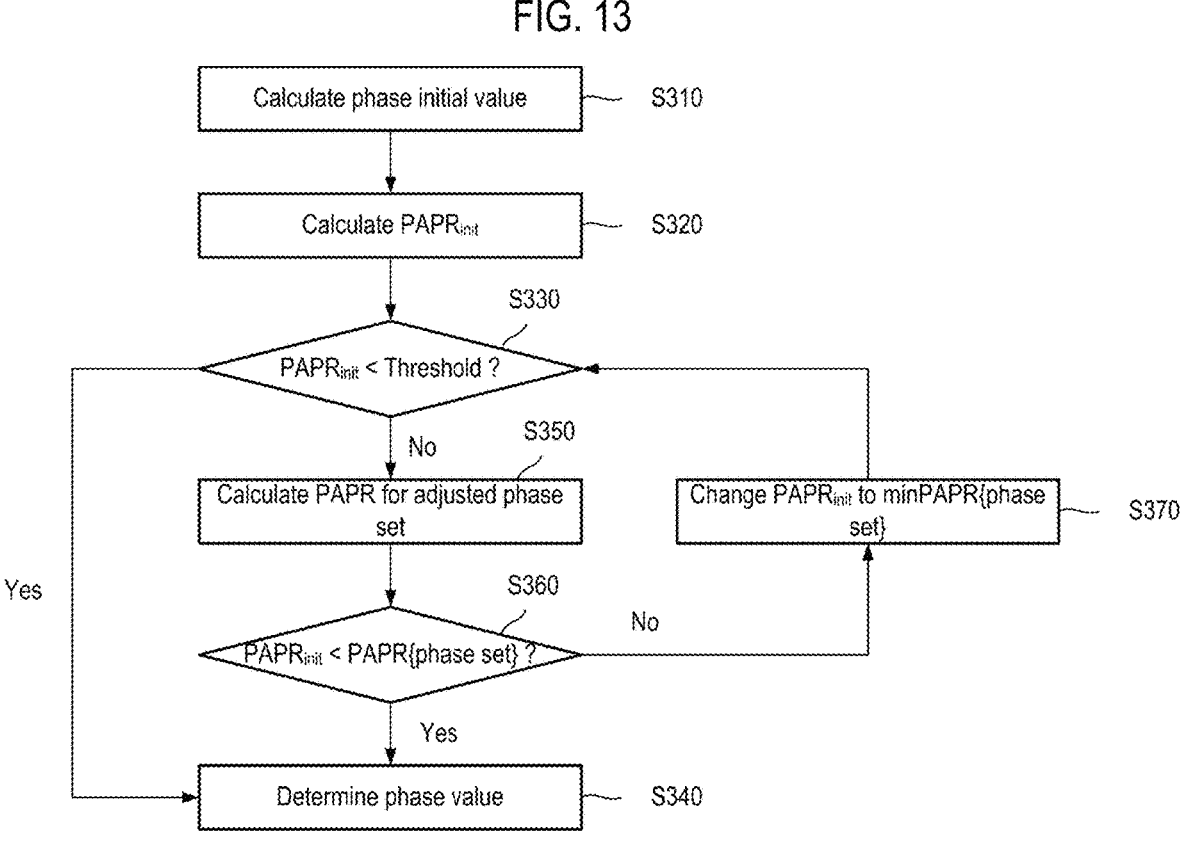
FIG. 13 is a flowchart illustrating a method of determining a phase of an RF circuit according to example embodiments.

FIG. 13 is a flowchart illustrating a method of determining a phase of an RF circuit according to example embodiments.

Refer to FIG. 13, in operation S310, the RF circuit 100A may calculate a plurality of phase initial values for a plurality of tones. For example, the calculation of the initial value of the phase may be performed based on Equations 4 to 7.

In operation S320, the RF circuit 100A may calculate a PAPR initial value (PAPR$_{init}$) of multi-tone signal MT_S corresponding to the plurality of phase initial values.

In operation S330, the RF circuit 100A may compare the PAPR initial value with a threshold.

When the PAPR initial value is less than the threshold in operation S330, the flow proceeds to operation S340 in which the RF circuit 100A may determine the phase initial value as the phase value. For example, when the PAPR initial value satisfies a required threshold, the RF circuit 100A may use the calculated phase initial value as it is.

Alternatively, when the PAPR initial value is greater than the threshold in operation S330, the flow proceeds to operation S350 in which the RF circuit 100A may adjust at least one of the plurality of phase initial values and may calculate a plurality of PAPR adjustment values of an output signal OUT corresponding to an adjustment phase set that includes the at least one adjusted phase initial value. Through operation S350, a PAPR adjustment value for each of a plurality of sets included in the adjustment phase set may be calculated. For example, the RF circuit 100A may adjust the phase initial value based on various optimization algorithms.

In operation S360, the RF circuit 100A may compare the PAPR initial value with a plurality of obtained PAPR adjustment values (PAPR {phase set}).

When the PAPR initial value is less than the plurality of PAPR adjustment values in operation S360, for example, when the PAPR initial value is less than all of the PAPR adjustment values, the RF circuit 100A may determine the phase initial value as a phase value.

Alternatively, when at least one of the plurality of PAPR adjustment values is less than the PAPR initial value in operation S360, for example, when even at least one PAPR adjustment values is lower than the PAPR initial value, the flow proceeds to operation S370 in which the RF circuit 100A may set a minimum value of the at least one PAPR adjustment values as the PAPR initial value.

Then, the RF circuit 100A may repeat operations S330 to S360 on the reset PAPR initial value. For example, the RF circuit 100A may determine the phase value by repeating the operations of comparing the reset PAPR initial value of PAPR with the threshold, determining the phase value, calculating the PAPR for the adjustment phase set, and comparing the PAPR initial value with the adjustment phase set.

Figure 14:
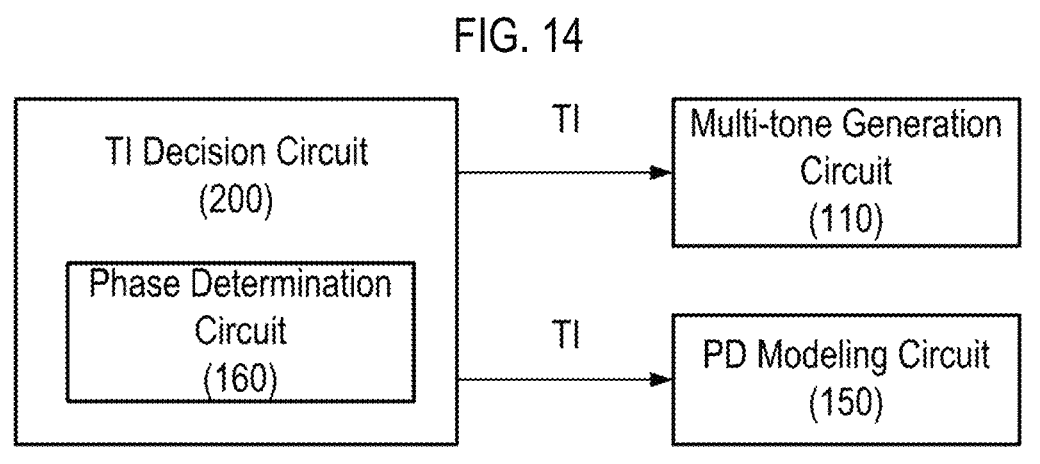

FIG. 14 is a diagram illustrating a training information determination circuit according to example embodiments.

Referring to FIG. 14, the training information determination circuit 200 may include the phase determination circuit 160 described in FIGS. 8 and 9. The operation of the phase determination circuit 160 corresponds to that described above.

The training information determination circuit 200 may be configured to generate training information TI including various types of information for generating a multi-tone signal MT_S to be used as a training signal, and to provide the training information TI to the multi-tone generation circuit 110 and/or the predistortion modeling circuit 150. For example, the training information TI may include a phase value of each of a plurality of tones determined by the phase determination circuit 160, the number of the tones, and a bandwidth of the multi-tone signal MT_S. The training information determination circuit 200 may generate a training signal having a uniform PDF by selecting, for example, the bandwidth closest to bandwidth of a signal to which predistortion is ultimately applied (for example, the modulation signal M_S). Alternatively, the training information determination circuit 200 may generate the training signal having the uniform PDF by selecting, for example, the number of bandwidths and tones which are capable of representing all frequency characteristics of the power amplifier 140 within the bandwidth.

In example embodiments, the training information determination circuit 200 may determine the training information TI based on at least one of 1) whether a predistortion model PD_M reflecting a memory effect has been used (for example, a memory predistortion model or a memoryless predistortion model), 2) the number of samples of the training signal, and/or a sampling rate of the samples, and 3) a bandwidth of a signal to which the predistortion is to be ultimately applied.

In example embodiments, when the predistortion model PD_M is memoryless, the training information determination circuit 200 may determine that a bandwidth, lower than the bandwidth of the modulation signal M_S, is a bandwidth of the multi-tone signal MT_S. For example, a memoryless predistortion model may be a model that averages performance characteristics based on frequency. In this case, it may be determined, depending on the frequency characteristics of the power amplifier 140, which of averaging the frequency characteristics of a training signal having a lower bandwidth and averaging the frequency characteristics of a training signal having a wider bandwidth is better in terms of predistortion performance. In addition, the wider the bandwidth of the training signal, the more memory effects may be reflected. However, the need to widen the bandwidth in the memoryless predistortion model, where memory effects are not considered, may be reduced.

Accordingly, the training information determination circuit 200 may determine the bandwidth of the multi-tone signal MT_S to be lower than the bandwidth of the modulation signal M_S, when the predistortion model PD_M is memoryless. In this case, the multi-tone generation circuit 110 may also generate a multi-tone signal MT_S having a lower bandwidth. The training information determination circuit 200 may also determine whether to decrease the bandwidth, by considering the number of available samples.

Alternatively, in example embodiments, when the predistortion model PD_M reflects memory effects, the training information determination circuit 200 may increase the bandwidth to reflect the memory effects more.

As the number of tones increases, so do the number of frequency characteristics considered. Therefore, the predistortion model PD_M may reflect the memory effects more. As a result, in example embodiments, when the predistortion model reflects the memory effects, the training information determination circuit 200 may increase the number of tones.

According to example embodiments, when the predistortion model PD_M is memoryless, the training information determination circuit 200 may decrease the number of tones to save resources for generating a training signal. However, when the number of tones is significantly decreased, performance degradation may be more likely to occur when the predistortion is applied to the modulation signal M_S having a higher bandwidth than the multi-tone signal MT_S due to the smaller number of samples. Accordingly, the training information determination circuit 200 may determine the number of tones of the multi-tone signal MT_S to be larger than the required number of tones.

Figure 15:
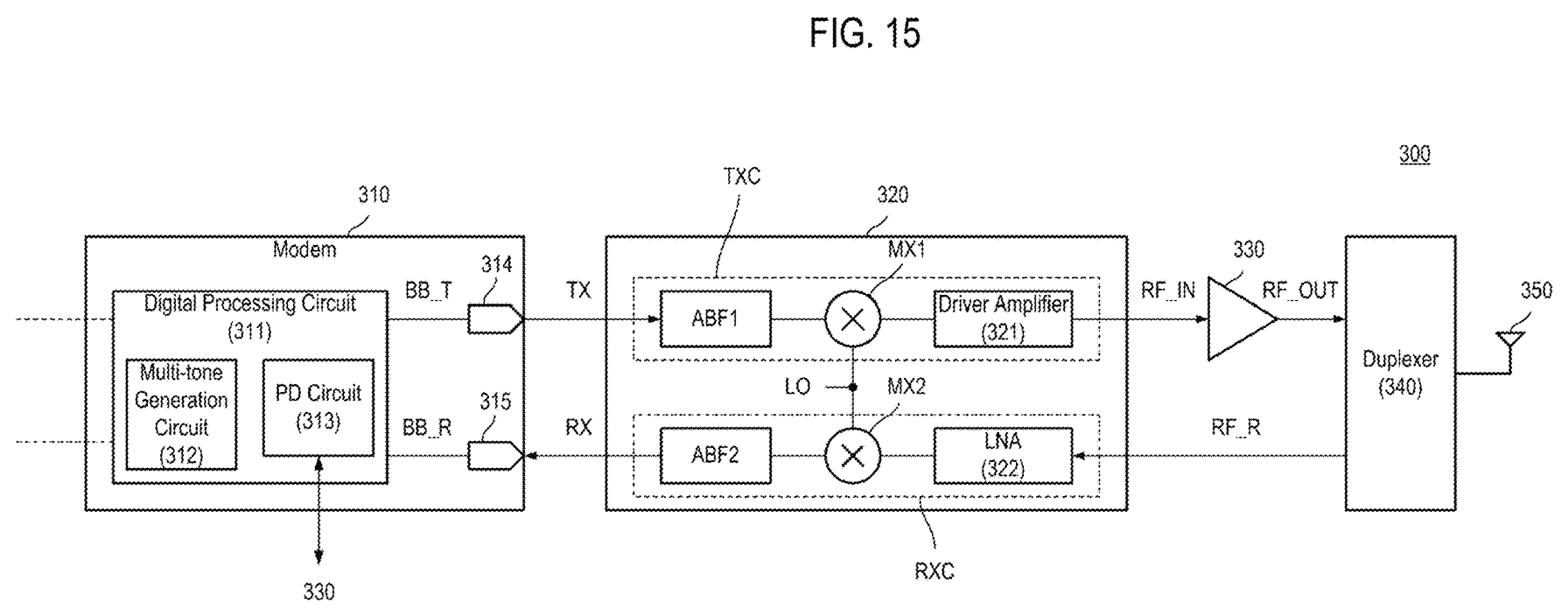

FIG. 15 is a diagram illustrating a wireless communication device according to example embodiments.

Referring to FIG. 15, a wireless communication device 300 may include a modem 310, a radio-frequency integrated circuit (RFIC) 320, a power amplifier 330, a duplexer 340, and an antenna 350.

The modem 310 may include a digital processing circuit 311, an analog-to-digital converter (ADC) 315, and a digital-to-analog converter (DAC) 314. The modem 310 may process a baseband signal BB_T (including, for example, an I signal and a Q signal) including information to be transmitted through the digital processing circuit 311 using various communication methods. The modem 310 may process the received baseband signal BB_R through the digital processing circuit 311 using various communication methods.

For example, the modem 310 may process a signal to be transmitted or a signal received using communication methods such as orthogonal frequency division multiplexing (OFDM), orthogonal frequency division multiple access (OFDMA), wideband code multiple access (WCDMA), or high speed packet access+ (HSPA+). In addition, the modem 310 may process the baseband signal BB_T or BB_R using various communication methods. For example, the modem 310 may use various communication methods employing technologies for modulating or demodulating an amplitude and a frequency of the baseband signal BB_T or BB_R.

The digital processing circuit 311 may perform various processing operations on the baseband signal in a digital domain. The digital processing circuit 311 may perform a predistortion operation according to the above-described various embodiments. The digital processing circuit 311 may include a multi-tone generation circuit 312 and a predistortion circuit 313, which generate a training signal used for predistortion, for example, a multi-tone signal.

The multi-tone generation circuit 312 may generate a multi-tone signal to be used as a training signal for the predistortion circuit 313 according to the above-described example embodiments.

The predistortion circuit 313 may perform the predistortion operation according to the above-described embodiments. For example, the predistortion circuit 313 may be configured to predistort the baseband signal BB_T based on the multi-tone signal and the predistortion model. The predistortion circuit 313 may predistort the baseband signal BB_T to compensate for the nonlinearity of the power amplifier 330. For example, in a changed scenario, the nonlinearity of the power amplifier 330 may be compensated for by employing a gain providing circuit.

In example embodiments, the modem 310 may generate training information including phase values of tones for generating a multi-tone signal, the number of the tones, and bandwidths of the tones. For example, the modem 310 may determine the phase values based on a PAPR of the multi-tone signal. For example, the modem 310 may determine the training information based on at least one of 1) whether a predistortion model reflecting memory effects has been used, 2) the number of samples of the training signal and/or a sampling rate of the samples, and 3) a bandwidth of a signal to which the predistortion is to be ultimately applied.

Each of the ADC 315 and the DAC 314 may be provided in singular or plural. The modem 310 may convert the baseband signal BB_T into an analog signal using the DAC 314 to generate a transmit signal TX. In addition, the modem 310 may receive the receive signal RX, an analog signal, from the RFIC 320. The modem 310 may digitally convert the receive signal RX through the ADC 315 provided therein to extract a baseband signal BB_R, a digital signal. For example, the receive signal RX may be a differential signal including a positive signal and a negative signal.

The RFIC 320 may perform a frequency up-conversion on the transmit signal TX to generate an RF input signal RF_IN, or may perform a frequency down-conversion on the RF receive signal RF_R to generate a receive signal RX. For example, the RFIC 320 may include a transmit circuit TXC, a receive circuit RXC, and a local oscillator LO.

The transmit circuit TXC may include a first analog baseband filter ABF1, a first mixer MX1, and a driver amplifier 321. For example, the first analog baseband filter ABF1 may include a low-pass filter.

The baseband filter ABF1 may filter and provide the transmit signal TX, received from the modem 310, to the first mixer MX1. Then, the first mixer MX1 may perform a frequency up-conversion to convert a frequency of the transmit signal TX from a baseband to a high-frequency band through a frequency signal provided by the local oscillator LO. Through the frequency up-conversion, the transmit signal TX may be provided to the driver amplifier 321 as an RF input signal RF_IN, and the driver amplifier 321 may firstly amplify and provide the RF input signal RF_IN to the power amplifier 330.

The power amplifier 330 may receive a DC voltage or a variable power supply voltage (for example, a dynamically variable output voltage), and may secondly amplify power of the RF input signal RF_IN based on the received power supply voltage to generate an RF output signal RF_OUT. In this case, the nonlinearity of the RF output signal RF_OUT may be compensated for by the predistortion circuit 313.

The receive circuit RXC may include a second analog baseband filter ABF2, a second mixer MX2, and a low-noise Amplifier (LNA) 322. For example, the second analog baseband filter ABF2 may include a low-pass filter.

The LNA 322 may amplify and provide an RF receive signal RF_R, received from the duplexer 340, to the second mixer MX2. Then, the second mixer MX2 may perform a frequency down-conversion to convert a frequency of the RF receive signal RF_R from a high-frequency band to a baseband through the frequency signal provided by the local oscillator LO. Through the frequency down-conversion, the RF receive signal RF_R may be provided to the second analog baseband filter ABF2 as a receive signal RX, and the second analog baseband filter ABF2 may filter and provide the receive signal RX to the modem 310.

For reference, the wireless communication device 300 may transmit a transmit signal (e.g., TX) through a plurality of frequency bands using carrier aggregation (CA). To accomplish this, the wireless communication device 300 may include a plurality of power amplifiers 330 for amplifying a plurality of RF input signals RF_IN, respectively corresponding to a plurality of carriers. In the present embodiment, for clarity of description and illustration, it has been described an example in which the power amplifier 330 is provided in singular.

The duplexer 340 may be connected to the antenna 350 to separate a transmit frequency and a receive frequency. For example, the duplexer 340 may separate an RF output signal RF_OUT, provided by the power amplifier 330, for each frequency band and provide the separated signal to the corresponding antenna 350. Additionally, the duplexer 340 may provide an external signal, received from the antenna 350, to the LNA 322 of the receive circuit RXC of the RFIC 320. For example, the duplexer 340 may include a front end module with an integrated duplexer (FEMiD).

For reference, the wireless communication device 300 may have a switch structure for separating the transmit frequency and receive frequency, rather than the duplexer 340. In addition, the wireless communication device 300 may have a structure including the duplexer 340 and a switch to separate the transmit frequency and receive frequency. For ease of description, in the present embodiment, it has been described an example in which the duplexer 340 for separating the transmit frequency and receive frequency is provided in the wireless communication device 300.

The antenna 350 may transmit an RF output signal RF_OUT, frequency-separated by the duplexer 340, to an external entity or provide the RF receive signal RF_R, received from an external entity, to the duplexer 340. For example, the antenna 350 may include an array antenna, but example embodiments are not limited thereto.

For reference, each of the modem 310, the RFIC 320, the power amplifier 330, and the duplexer 340 may be implemented as an integrated circuit (IC), a chip, or a module. In addition, the modem 310, the RFIC 320, the power amplifier 330, and the duplexer 340 may be mounted together on a printed circuit board (PCB), but example embodiments are not limited thereto. In some embodiments, at least a portion of the modem 310, the RFIC 320, the power amplifier 330, and the duplexer 340 may be implemented as a single communication chip.

Furthermore, the wireless communication device 300 illustrated in FIG. 15 may be included in a wireless communication system using a cellular network such as 5G or LTE, or may be included in a wireless local area network (WLAN) system or any other arbitrary wireless communication system. For reference, the configuration of the wireless communication device 300 illustrated in FIG. 15 is merely an example, and example embodiments are not limited thereto. The wireless communication device 300 illustrated in FIG. 15 may be configured in various ways depending on a communication protocol or a communication method.

Figure 16:
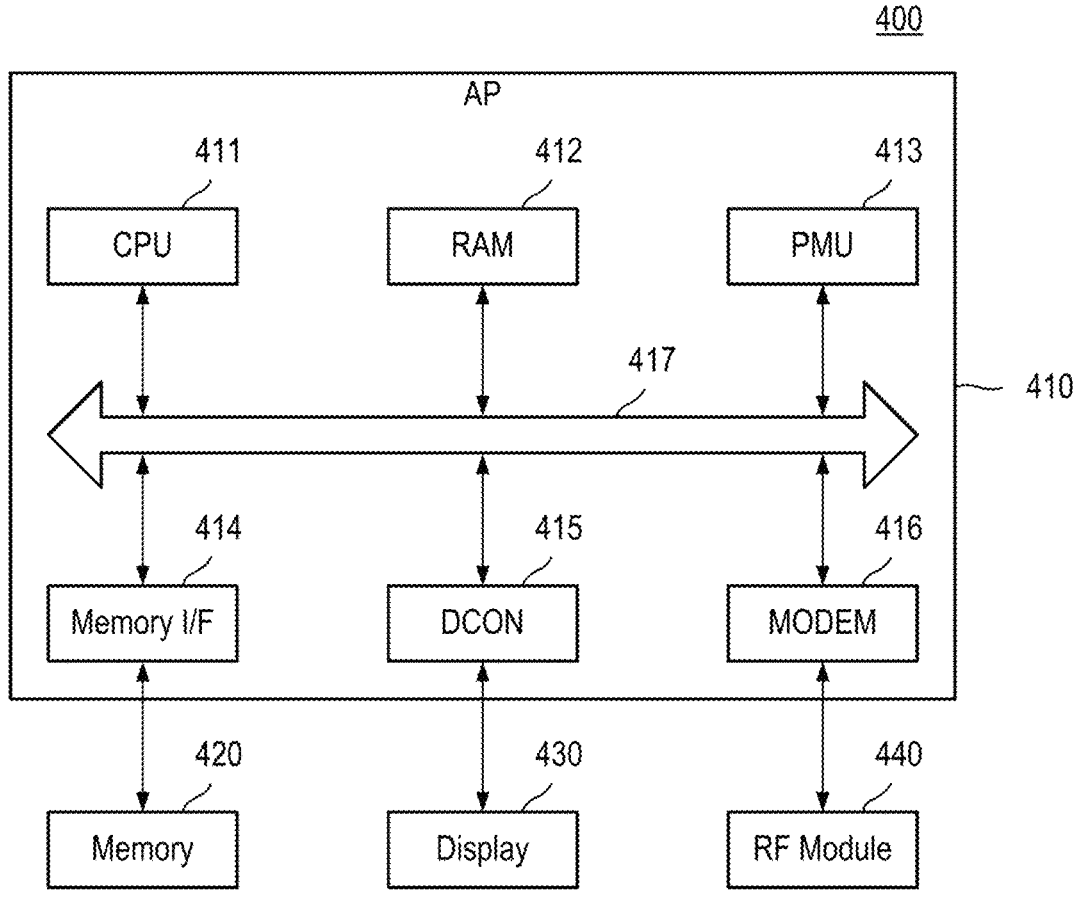
FIG. 16 is a diagram illustrating an electronic device according to example embodiments.

FIG. 16 is a diagram illustrating an electronic device according to example embodiments.

Referencing FIG. 16, an electronic device 400 may be, for example, a mobile terminal and may include an application processor (AP) 410, a memory 420, a display 430, and an RF module 440. The electronic device 400 may further include various components such as a lens, a sensor, or an audio module.

The AP 410 may be implemented as a system-on-chip (SoC) and may include a central processing unit (CPU) 411, a RAM 412, a power management unit (PMU) 413, a memory interface (Memory I/F) 414, a display controller (DCON) 415, a modem (MODEM) 416, and a bus (System Bus) 417. The AP 410 may further include various IPs. The AP 410 may be referred to as ModAP as functions of a modem chip are integrated therein.

The CPU 411 may control the overall operation of the AP 410 and the electronic device 400. The CPU 411 may be configured to execute at least one instruction stored in the RAM 412, and may control the operation of each component of the AP 410 through the instruction. The CPU 411 may also be implemented as a multi-core. The multi-core may be a computing component having two or more independent cores.

In example embodiments, the CPU 411 may control the modem 416 and/or the RF module 440 to generate a multi-tone signal including a plurality of tones, predistort the multi-tone signal or a modulation signal to output a predistortion signal, amplify the predistortion signal to output an output signal OUT, and model a predistortion model based on the predistortion signal corresponding to the multi-tone signal and the output signal OUT.

For example, the CPU 411 may control the modem 416 and/or the RF module 440 to model a power amplifier model, which is a relationship between the predistortion signal and the output signal OUT corresponding to the multi-tone signal, based on a moving average method and to model a predistortion model to compensate for the nonlinearity of the power amplifier model.

For example, the CPU 411 may control the modem 416 and/or the RF module 440 to calculate a plurality of phase initial values for the plurality of tones, calculate a PAPR initial value of the multi-tone signal corresponding to the plurality of initial phase values, and determine the phase initial value as a phase value of each of the plurality of tones based on the initial PAPR value being less than a threshold.

The RAM 412 may temporarily store programs, data, or at least one instruction. For example, programs and/or data stored in memory 420 may be temporarily stored in the RAM 412 under the control of the CPU 411 or a booting code. The RAM 412 may be implemented as a DRAM or an SRAM.

The PMU 413 may manage power of each component of the AP 410. The PMU 413 may determine an operating status of each component of the AP 410 and control an operation thereof.

The memory interface 414 may control the overall operation of the memory 420, and may control data exchange between the memory 420 and each component of the AP 410. The memory interface 414 may write data in the memory 420 or read data from the memory 420 according to a request of the CPU 411. For example, the memory 420 may store various types of information (for example, a multi-tone signal, training information, or the like) according to the above-described embodiments. For example, the memory 420 may store a power amplifier model and a predistortion model as set forth in the above-described embodiments.

The display controller 415 may transmit video data to be displayed on the display 430 to the display 430. The display 430 may be implemented as a flat display such as a liquid crystal display (LCD), an organic light emitting diode (OLED), or a flexible display.

For wireless communications, the modem 416 may modulate data to be transmitted appropriately for a wireless environment and recover received data. The modem 416 may perform digital communication with the RF module 440.

For reference, the modem 416 may be implemented with modem 310 described above with reference to FIG. 15.

The RF module 440 may convert a high-frequency signal, received through an antenna, into a low-frequency signal and transmit the converted low-frequency signal to the modem 416. In addition, the RF module 440 may convert a low-frequency signal, received from the modem 416, into a high-frequency signal and transmit the converted high-frequency signal to the outside of the electronic device 400 through the antenna. In addition, the RF module 440 may amplify or filter a signal.

For reference, the RF module 440 may be implemented with the RFIC 320, the power amplifier 330, the duplexer 340, and the antenna 350 described above with reference FIG. 15.

Alternatively, the modem 416 and the RF module 440 may be implemented with at least one of the RF circuit 100 or 100A, the phase determination circuit 160, and the training information determination circuit 200 according to example embodiments.

As set forth above, according to example embodiments, an RF circuit for predistortion and a method of operating the same may be provided.

While example embodiments have been shown and described above, it will be apparent to those skilled in the art that modifications and variations can be made thereto without departing from the scope of the inventive concept as set forth by the appended claims.

What is claimed is:

1. A radio-frequency (RF) circuit comprising:
   a multi-tone generation circuit configured to generate a multi-tone signal comprising a plurality of tones, wherein the multi-tone generation circuit is configured to generate the multi-tone signal having a uniform probability density function;

a predistortion circuit configured to predistort the multi-tone signal or a modulation signal and output a predistortion signal;

a power amplifier configured to amplify the predistortion signal and output an output signal; and a predistortion modeling circuit configured to model a predistortion model corresponding to the predistortion circuit based on the predistortion signal corresponding to the multi-tone signal and the output signal.

2. The RF circuit of claim 1, wherein the multi-tone signal is a real signal.

3. The RF circuit of claim 1, further comprising:

a multiplexer configured to selected one of the multi-tone signal and the modulation signal and transmit the selected signal to the predistortion circuit.

4. The RF circuit of claim 1, wherein the predistortion circuit is configured to receive the predistortion model from the predistortion modeling circuit and perform the predistortion based on the predistortion model.

5. The RF circuit of claim 1, wherein the predistortion modeling circuit is configured to:

model a power amplifier model, which is a relationship between the predistortion signal corresponding to the multi-tone signal and the output signal, based on a moving average method; and model the predistortion model to compensate for nonlinearity of the power amplifier model.

6. The RF circuit of claim 5, wherein the moving average method is a method of dividing an input axis of the power amplifier model into a plurality of sections and selecting an average value of outputs included in the plurality of sections as a representative value of each of the plurality of sections.

7. The RF circuit of claim 1, further comprising:

a phase determination circuit configured to determine a phase value of each of the plurality of tones in the multi-tone signal.

8. The RF circuit of claim 7, wherein the phase determination circuit is configured to calculate a plurality of phase initial values for the plurality of tones, calculate a peak-to-average power ratio (PAPR) initial value of the multi-tone signal corresponding to the plurality of phase initial values, and determine the phase initial value as the phase value when the PAPR initial value is less than a threshold.

9. The RF circuit of claim 8, wherein the phase determination circuit is configured to adjust at least one of the plurality of phase initial values when the PAPR initial value is greater than the threshold, calculate a plurality of PAPR adjustment values of the output signal corresponding to an adjustment phase set that includes the at least one adjusted phase initial value, and determine the phase initial value as the phase value when the PAPR initial value is less than the plurality of PAPR adjustment values.

10. The RF circuit of claim 9, wherein the phase determination circuit is configured to set a minimum value of the PAPR initial value as the PAPR initial value when at least one of the plurality of PAPR adjustment values is less than the PAPR initial value, and to determine the phase value based on the PAPR initial value after setting the minimum value.

11. The RF circuit of claim 1, wherein the multi-tone generation circuit is configured to generate the multi-tone signal to have a bandwidth lower than a bandwidth of the modulation signal when the predistortion model is memoryless.

12. A method of operating a radio-frequency (RF) circuit, the method comprising:

generating a multi-tone signal having a uniform probability density function to generate the multi-tone signal comprising a plurality of tones;

distorting the multi-tone signal and outputting a predistortion signal;

amplifying the predistortion signal and outputting an output signal; and modeling a predistortion model based on the predistortion signal corresponding to the multi-tone signal and the output signal.

13. The method of claim 12, further comprising:

predistorting a modulation signal based on the predistortion model.

14. The method of claim 12, wherein the modeling the predistortion model comprises:

modeling a power amplifier model, which is a relationship between the predistortion signal corresponding to the multi-tone signal and the output signal, based on a moving average method; and modeling the predistortion model to compensate for nonlinearity of the power amplifier model.

15. The method of claim 12, further comprising:

determining a phase value of each of the plurality of tones in the multi-tone signal.

16. The method of claim 15, wherein the determining the phase value comprises:

calculating a plurality of phase initial values for the plurality of tones;

calculating a peak-to-average power ratio (PAPR) initial value of the multi-tone signal corresponding to the plurality of phase initial values; and determining the phase initial value as the phase value when the PAPR initial value is less than a threshold.

17. The method of claim 16, wherein the determining the phase value further comprises:

adjusting at least one of the plurality of phase initial values when the PAPR initial value is greater than the threshold;

calculating a plurality of PAPR adjustment values of the output signal corresponding to an adjustment phase set that includes the at least one adjusted phase initial value; and determining the phase initial value as the phase value when the PAPR value initial value is less than the plurality of PAPR adjustment values.

18. An electronic device comprising:

a memory configured to store at least one instruction; and at least one processor configured to execute the at least one instruction, wherein the at least one processor executes the at least one instruction to:

generate a multi-tone signal having a uniform probability density function to generate the multi-tone signal comprising a plurality of tones;

distort the multi-tone signal or a modulation signal and output a prediction signal;

amplify the predistortion signal and output an output signal; and model a predistortion model based on the predistortion signal corresponding to the multi-tone signal and the output signal.

19. The electronic device of claim 18, wherein the at least one processor executes the at least one instruction to:

model a power amplifier model, which is a relationship between the predistortion signal corresponding to the multi-tone signal and the output signal, based on a moving average method; and model the predistortion model to compensate for nonlinearity of the power amplifier model.

20. The electronic device of claim 18, wherein the at least one processor executes the at least one instruction to:

calculate a plurality of phase initial values for the plurality of tones;

calculate a peak-to-average power ratio (PAPR) of the multi-tone signal corresponding to the plurality of phase initial values; and determine the phase initial value as a phase value of each of the plurality of tones when the PAPR initial value is less than a threshold.

* * * * *